United States Patent
Leong et al.

(10) Patent No.: US 10,804,051 B2
(45) Date of Patent: *Oct. 13, 2020

(54) KEYCAPS HAVING REDUCED THICKNESS

(71) Applicant: Apple Inc., Cupertino, CA (US)

(72) Inventors: Craig C. Leong, San Jose, CA (US); Derrick T. Jue, San Francisco, CA (US); Hilbert T. Kwan, Cupertino, CA (US); Keith J. Hendren, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,148

(22) Filed: Feb. 22, 2019

(65) Prior Publication Data

US 2019/0214201 A1 Jul. 11, 2019

Related U.S. Application Data

(63) Continuation of application No. 15/640,249, filed on Jun. 30, 2017, now Pat. No. 10,224,157, which is a
(Continued)

(51) Int. Cl.
*H01H 13/704* (2006.01)
*G06F 3/02* (2006.01)
(Continued)

(52) U.S. Cl.
CPC ......... *H01H 13/704* (2013.01); *G06F 3/0202* (2013.01); *H01H 11/00* (2013.01);
(Continued)

(58) Field of Classification Search
CPC .. H01H 3/00; H01H 3/02; H01H 3/12; H01H 13/023; H01H 13/04; H01H 13/704;
(Continued)

(56) References Cited

U.S. PATENT DOCUMENTS 3,657,492 A 4/1972 Arndt et al.
3,818,153 A 6/1974 Arvai
(Continued)

FOREIGN PATENT DOCUMENTS

CN 2155620 Y 2/1994
CN 2394309 Y 8/2000
(Continued)

OTHER PUBLICATIONS

International Search Report and Written Opinion, PCT/US2014/052005, 17 pages, dated Jan. 29, 2015.
(Continued)

*Primary Examiner* — Anthony R Jiminez
(74) *Attorney, Agent, or Firm* — Dorsey & Whitney LLP

(57) ABSTRACT

An illuminated glass keycap having a glyph diffuser layer that may diffuse light through a glyph window opened in a background layer. The background layer may be opaque and the glyph window may be transparent. The keycap is adhered to a scissor mechanism positioned above electrical switch circuitry. Included within, below, or adjacent to the scissor mechanism may be one or more light sources positioned to emit light through the keycap, around the perimeter of the keycap, and/or through the background layer.

20 Claims, 8 Drawing Sheets

Related U.S. Application Data continuation of application No. 14/502,788, filed on Sep. 30, 2014, now Pat. No. 9,704,670.

(60) Provisional application No. 61/884,259, filed on Sep. 30, 2013.

(51) Int. Cl.
| | |
|---|---|
| *H01H 11/00* | (2006.01) |
| *H01H 13/02* | (2006.01) |
| *H01H 13/04* | (2006.01) |
| *H01H 13/83* | (2006.01) |

(52) U.S. Cl.
CPC .......... *H01H 13/023* (2013.01); *H01H 13/04* (2013.01); *H01H 13/83* (2013.01); *H01H 2219/03* (2013.01); *H01H 2219/048* (2013.01); *H01H 2219/056* (2013.01); *H01H 2223/038* (2013.01); *H01H 2227/036* (2013.01)

(58) Field of Classification Search
CPC .... H01H 11/00; H01H 13/83; H01H 2219/03; H01H 2219/048; H01H 2219/056; H01H 2223/038; H01H 2227/036; H01H 1/00; H01H 13/702; H01H 13/703; H01H 2203/008; H01H 2207/01; H01H 2231/002; H01H 2231/012; H01H 2231/016; H01H 2231/052; H01H 2239/006; H01H 2239/056; H01H 2239/074; G06F 3/0202
USPC .......................................... 345/173; 200/5 R
See application file for complete search history.

(56) References Cited

U.S. PATENT DOCUMENTS

| | | |
|---|---|---|
| 3,917,917 A | 11/1975 | Murata |
| 3,978,297 A | 8/1976 | Lynn et al. |
| 4,095,066 A | 6/1978 | Harris |
| 4,319,099 A | 3/1982 | Asher |
| 4,349,712 A | 9/1982 | Michalski |
| 4,484,042 A | 11/1984 | Matsui |
| 4,596,905 A | 6/1986 | Fowler |
| 4,598,181 A | 7/1986 | Selby |
| 4,670,084 A | 6/1987 | Durand et al. |
| 4,755,645 A | 7/1988 | Naoki et al. |
| 4,937,408 A | 6/1990 | Hattori et al. |
| 4,987,275 A | 1/1991 | Miller et al. |
| 5,021,638 A | 6/1991 | Nopper et al. |
| 5,092,459 A | 3/1992 | Uljanic et al. |
| 5,136,131 A | 8/1992 | Komaki |
| 5,278,372 A | 1/1994 | Takagi et al. |
| 5,280,146 A | 1/1994 | Inagaki et al. |
| 5,340,955 A | 8/1994 | Calvillo et al. |
| 5,382,762 A | 1/1995 | Mochizuki |
| 5,397,867 A | 3/1995 | Demeo |
| 5,408,060 A | 4/1995 | Muurinen |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,769,210 A | 6/1998 | Tsai |
| 5,804,780 A | 9/1998 | Bartha |
| 5,828,015 A | 10/1998 | Coulon |
| 5,847,337 A | 12/1998 | Chen |
| 5,874,700 A | 2/1999 | Hochgesang |
| 5,875,013 A | 2/1999 | Takahara |
| 5,876,106 A | 3/1999 | Kordecki et al. |
| 5,878,872 A | 3/1999 | Tsai |
| 5,881,866 A | 3/1999 | Miyajima et al. |
| 5,898,147 A | 4/1999 | Domzalsi et al. |
| 5,924,555 A | 7/1999 | Sadamori et al. |
| 5,935,691 A | 8/1999 | Tsai |
| 5,960,942 A | 10/1999 | Thornton |
| 5,986,227 A | 11/1999 | Hon |
| 6,020,565 A | 2/2000 | Pan |
| 6,068,416 A | 5/2000 | Kumamoto et al. |
| 6,215,420 B1 | 4/2001 | Harrison et al. |
| 6,257,782 B1 | 7/2001 | Maruyama et al. |
| 6,259,046 B1 | 7/2001 | Iwama et al. |
| 6,377,685 B1 | 4/2002 | Krishnan |
| 6,388,219 B2 | 5/2002 | Hsu et al. |
| 6,423,918 B1 | 7/2002 | King et al. |
| 6,482,032 B1 | 11/2002 | Szu et al. |
| 6,530,283 B2 | 3/2003 | Okada et al. |
| 6,538,801 B2 | 3/2003 | Jacobson et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,560,612 B1 | 5/2003 | Yamada et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,648,530 B2 | 11/2003 | Kamei et al. |
| 6,706,986 B2 | 3/2004 | Hsu |
| 6,738,050 B2 | 5/2004 | Comiskey et al. |
| 6,750,414 B2 | 6/2004 | Sullivan |
| 6,759,614 B2 | 7/2004 | Yoneyama |
| 6,762,381 B2 | 7/2004 | Kunthady et al. |
| 6,765,503 B1 | 7/2004 | Chan et al. |
| 6,788,450 B2 | 9/2004 | Kawai et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,911,608 B2 | 6/2005 | Levy |
| 6,926,418 B2 | 8/2005 | Oestergaard et al. |
| 6,940,030 B2 | 9/2005 | Takeda et al. |
| 6,977,352 B2 | 12/2005 | Oosawa |
| 6,979,792 B1 | 12/2005 | Lai |
| 6,987,466 B1 | 1/2006 | Welch et al. |
| 6,987,503 B2 | 1/2006 | Inoue |
| 7,012,206 B2 | 3/2006 | Oikawa |
| 7,030,330 B2 | 4/2006 | Suda |
| 7,038,832 B2 | 5/2006 | Kanbe |
| 7,126,499 B2 | 10/2006 | Lin et al. |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,154,059 B2 | 12/2006 | Chou |
| 7,166,813 B2 | 1/2007 | Soma |
| 7,172,303 B2 | 2/2007 | Shipman et al. |
| 7,189,932 B2 | 3/2007 | Kim |
| 7,256,766 B2 | 8/2007 | Albert et al. |
| 7,283,119 B2 | 10/2007 | Kishi |
| 7,301,113 B2 | 11/2007 | Nishimura et al. |
| 7,312,790 B2 | 12/2007 | Sato et al. |
| 7,378,607 B2 | 5/2008 | Koyano et al. |
| 7,385,806 B2 | 6/2008 | Liao |
| 7,391,555 B2 | 6/2008 | Albert et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,589,292 B2 | 9/2009 | Jung et al. |
| 7,639,187 B2 | 12/2009 | Caballero et al. |
| 7,639,571 B2 | 12/2009 | Ishii et al. |
| 7,651,231 B2 | 1/2010 | Chou et al. |
| 7,674,992 B2 | 3/2010 | Hutchison et al. |
| 7,679,010 B2 | 3/2010 | Wingett |
| 7,724,415 B2 | 5/2010 | Yamaguchi |
| 7,781,690 B2 | 8/2010 | Ishii |
| 7,813,774 B2 | 10/2010 | Perez-Noguera |

(56) References Cited

U.S. PATENT DOCUMENTS

| | | |
|---|---|---|
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,944,437 B2 | 5/2011 | Imamura |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,077,096 B2 | 12/2011 | Chiang et al. |
| 8,080,744 B2 | 12/2011 | Yeh et al. |
| 8,098,228 B2 | 1/2012 | Shimodaira et al. |
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 8/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,684 B2 | 11/2012 | Matsuo et al. |
| 8,319,129 B2 | 11/2012 | Nishino |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,431,849 B2 | 4/2013 | Chen |
| 8,436,265 B2 | 5/2013 | Koike et al. |
| 8,451,146 B2 | 5/2013 | Mahowald et al. |
| 8,462,514 B2 | 6/2013 | Myers et al. |
| 8,480,285 B2 | 7/2013 | Tan et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,695,211 B2 | 4/2014 | Hyuga et al. |
| 8,731,618 B2 | 5/2014 | Jarvis et al. |
| 8,748,767 B2 * | 6/2014 | Ozias ................. G06F 1/1662 200/310 |
| 8,759,705 B2 | 6/2014 | Funakoshi et al. |
| 8,760,405 B2 | 6/2014 | Nam |
| 8,779,308 B2 | 7/2014 | Takemae et al. |
| 8,786,548 B2 | 7/2014 | Oh et al. |
| 8,791,378 B2 | 7/2014 | Lan |
| 8,835,784 B2 | 9/2014 | Hirota |
| 8,847,089 B2 | 9/2014 | Fujibayashi |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,888,305 B2 | 11/2014 | Chen |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,612,674 B2 | 4/2017 | Degner et al. |
| 9,640,347 B2 | 5/2017 | Kwan et al. |
| 9,704,670 B2 * | 7/2017 | Leong ................. H01H 13/83 |
| 9,734,965 B2 | 8/2017 | Verde Martínez et al. |
| 9,793,066 B1 | 10/2017 | Brock et al. |
| 10,224,157 B2 * | 3/2019 | Leong ................. H01H 13/83 |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0129542 A1 * | 7/2004 | Kawaguchi ............ H01H 9/182 200/61.1 |
| 2004/0225965 A1 | 11/2004 | Garside et al. |
| 2005/0035950 A1 | 2/2005 | Daniels |
| 2005/0071771 A1 | 3/2005 | Nagasawa et al. |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0202824 A1 | 8/2008 | Philpp et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2009/0295736 A1 | 12/2009 | Laurent et al. |
| 2009/0322568 A1 | 12/2009 | Yoshida |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0252407 A1 | 10/2010 | Merminod et al. |
| 2010/0253630 A1 | 10/2010 | Homma et al. |

(56) References Cited

U.S. PATENT DOCUMENTS

| | | |
|---|---|---|
| 2011/0002724 A1* | 1/2011 | Sauvage .............. G06F 3/0202 400/495 |
| 2011/0032127 A1 | 2/2011 | Roush |
| 2011/0043384 A1 | 2/2011 | Cheng |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0043191 A1* | 2/2012 | Kessler .................. H01H 3/125 200/5 A |
| 2012/0090973 A1 | 4/2012 | Liu |
| 2012/0098751 A1 | 4/2012 | Liu |
| 2012/0186965 A1 | 7/2012 | Zieder |
| 2012/0286701 A1 | 11/2012 | Yang et al. |
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093684 A1 | 4/2013 | Wang et al. |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Broer et al. |
| 2013/0270090 A1 | 10/2013 | Lee |
| 2013/0336127 A1 | 12/2013 | Wu |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0118264 A1 | 5/2014 | Leong et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090571 A1 | 4/2015 | Leong et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0332874 A1 | 11/2015 | Brock et al. |
| 2015/0348726 A1 | 12/2015 | Hendren |
| 2015/0370339 A1 | 12/2015 | Ligtenberg et al. |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0259375 A1 | 9/2016 | Andre et al. |
| 2016/0329166 A1 | 11/2016 | Hou et al. |
| 2016/0336124 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004937 A1 | 1/2017 | Leong et al. |
| 2017/0004939 A1 | 1/2017 | Kwan et al. |
| 2017/0011869 A1 | 1/2017 | Knopf et al. |
| 2017/0090104 A1 | 3/2017 | Cao et al. |
| 2017/0090106 A1 | 3/2017 | Cao et al. |
| 2017/0301487 A1 | 10/2017 | Leong et al. |
| 2017/0315624 A1 | 11/2017 | Leong et al. |
| 2018/0029339 A1 | 2/2018 | Niu et al. |
| 2018/0040441 A1 | 2/2018 | Wu |
| 2018/0074694 A1 | 3/2018 | Lehmann |

FOREIGN PATENT DOCUMENTS

| | | |
|---|---|---|
| CN | 1463458 A | 12/2003 |
| CN | 1533128 A | 9/2004 |
| CN | 1542497 A | 11/2004 |
| CN | 2672832 Y | 1/2005 |
| CN | 1624842 A | 6/2005 |
| CN | 1812030 A | 8/2006 |
| CN | 1838036 A | 9/2006 |
| CN | 1855332 A | 11/2006 |
| CN | 101051569 A | 10/2007 |
| CN | 200961844 Y | 10/2007 |
| CN | 200986871 Y | 12/2007 |
| CN | 101146137 A | 3/2008 |
| CN | 201054315 Y | 4/2008 |
| CN | 201084602 Y | 7/2008 |
| CN | 201123174 Y | 9/2008 |
| CN | 201149829 Y | 11/2008 |
| CN | 101315841 A | 12/2008 |
| CN | 201210457 Y | 3/2009 |
| CN | 101438228 A | 5/2009 |
| CN | 101465226 A | 6/2009 |
| CN | 101494130 A | 7/2009 |
| CN | 101502082 A | 8/2009 |
| CN | 201298481 Y | 8/2009 |
| CN | 101546667 A | 9/2009 |
| CN | 101572195 A | 11/2009 |
| CN | 101800281 A | 8/2010 |
| CN | 101807482 A | 8/2010 |
| CN | 101868773 A | 10/2010 |
| CN | 201655616 U | 11/2010 |
| CN | 102110542 A | 6/2011 |
| CN | 102163084 A | 8/2011 |
| CN | 201927524 U | 8/2011 |
| CN | 201945951 U | 8/2011 |
| CN | 201945952 U | 8/2011 |
| CN | 201956238 U | 8/2011 |
| CN | 102197452 A | 9/2011 |
| CN | 202008941 U | 10/2011 |
| CN | 202040690 U | 11/2011 |
| CN | 102280292 A | 12/2011 |
| CN | 102338348 A | 2/2012 |
| CN | 102375550 A | 3/2012 |
| CN | 202205161 U | 4/2012 |
| CN | 102469527 A | 5/2012 |
| CN | 102496509 A | 6/2012 |
| CN | 102622089 A | 8/2012 |
| CN | 102629526 A | 8/2012 |
| CN | 102629527 A | 8/2012 |
| CN | 102679239 A | 9/2012 |
| CN | 202434387 U | 9/2012 |
| CN | 202523007 U | 11/2012 |
| CN | 102832068 A | 12/2012 |
| CN | 102955573 A | 3/2013 |
| CN | 102956386 A | 3/2013 |
| CN | 102969183 A | 3/2013 |
| CN | 103000417 A | 3/2013 |
| CN | 103165327 A | 6/2013 |
| CN | 103180979 A | 6/2013 |
| CN | 203012648 U | 6/2013 |
| CN | 203135988 U | 8/2013 |
| CN | 103377841 A | 10/2013 |
| CN | 103489986 A | 1/2014 |
| CN | 203414880 U | 1/2014 |
| CN | 103681056 A | 3/2014 |
| CN | 103699181 A | 4/2014 |
| CN | 203520312 U | 4/2014 |
| CN | 203588895 U | 5/2014 |
| CN | 103839715 A | 6/2014 |
| CN | 103839720 A | 6/2014 |
| CN | 103839722 A | 6/2014 |
| CN | 103903891 A | 7/2014 |
| CN | 103956290 A | 7/2014 |

(56) References Cited

FOREIGN PATENT DOCUMENTS

| | | |
|---|---|---|
| CN | 203733685 U | 7/2014 |
| CN | 104021968 A | 9/2014 |
| CN | 204102769 U | 1/2015 |
| CN | 204117915 U | 1/2015 |
| CN | 104517769 A | 4/2015 |
| CN | 204632641 U | 9/2015 |
| CN | 105097341 A | 11/2015 |
| DE | 2530176 A1 | 1/1977 |
| DE | 3002772 A1 | 7/1981 |
| DE | 29704100 U1 | 4/1997 |
| DE | 202008001970 U1 | 5/2008 |
| EP | 0441993 A1 | 8/1991 |
| EP | 1835272 A1 | 9/2007 |
| EP | 1928008 A1 | 6/2008 |
| EP | 2022606 A2 | 2/2009 |
| EP | 2426688 A1 | 3/2012 |
| EP | 2439760 A1 | 4/2012 |
| EP | 2463798 A1 | 6/2012 |
| EP | 2664979 A1 | 11/2013 |
| FR | 2147420 A5 | 3/1973 |
| FR | 2911000 A1 | 7/2008 |
| FR | 2950193 A1 | 3/2011 |
| GB | 1361459 A | 7/1974 |
| JP | S50115562 U | 9/1975 |
| JP | S60055477 | 3/1985 |
| JP | S61172422 U | 10/1986 |
| JP | S62072429 | 4/1987 |
| JP | S63182024 U | 11/1988 |
| JP | H0422024 U | 2/1992 |
| JP | H0520963 U | 3/1993 |
| JP | H0524512 U | 3/1993 |
| JP | H05342944 A | 12/1993 |
| JP | H09204148 A | 8/1997 |
| JP | H10312726 A | 11/1998 |
| JP | H11194882 A | 7/1999 |
| JP | 2000010709 A | 1/2000 |
| JP | 2000057871 A | 2/2000 |
| JP | 2000339097 A | 12/2000 |
| JP | 2001100889 A | 4/2001 |
| JP | 2002260478 A | 9/2002 |
| JP | 2002298689 A | 10/2002 |
| JP | 2003114751 A | 4/2003 |
| JP | 2003522998 A | 7/2003 |
| JP | 2005108041 A | 4/2005 |
| JP | 2006164929 A | 6/2006 |
| JP | 2006185906 A | 7/2006 |
| JP | 2006521664 A | 9/2006 |
| JP | 2006269439 A | 10/2006 |
| JP | 2006277013 A | 10/2006 |
| JP | 2006344609 A | 12/2006 |
| JP | 2007115633 A | 5/2007 |
| JP | 2007514247 A | 5/2007 |
| JP | 2007156983 A | 6/2007 |
| JP | 2008021428 A | 1/2008 |
| JP | 2008041431 A | 2/2008 |
| JP | 2008100129 A | 5/2008 |
| JP | 2008191850 A | 8/2008 |
| JP | 2008533559 A | 8/2008 |
| JP | 2008293922 A | 12/2008 |
| JP | 2009099503 A | 5/2009 |
| JP | 2009181894 A | 8/2009 |
| JP | 2010061956 A | 3/2010 |
| JP | 2010244088 A | 10/2010 |
| JP | 2010244302 A | 10/2010 |
| JP | 2011018484 A | 1/2011 |
| JP | 2011065126 A | 3/2011 |
| JP | 2011150804 A | 8/2011 |
| JP | 2011165630 A | 8/2011 |
| JP | 2011524066 A | 8/2011 |
| JP | 2011187297 A | 9/2011 |
| JP | 2012022473 A | 2/2012 |
| JP | 2012043705 A | 3/2012 |
| JP | 2012063630 A | 3/2012 |
| JP | 2012098873 A | 5/2012 |
| JP | 2012134064 A | 7/2012 |
| JP | 2012186067 A | 9/2012 |
| JP | 2012230256 A | 11/2012 |
| JP | 2014017179 A | 1/2014 |
| JP | 2014026807 A | 2/2014 |
| JP | 2014216190 A | 11/2014 |
| JP | 2014220039 A | 11/2014 |
| JP | 2016053778 A | 4/2016 |
| KR | 1019990007394 | 1/1999 |
| KR | 1020020001668 | 1/2002 |
| KR | 100454203 B1 | 10/2004 |
| KR | 1020060083032 | 7/2006 |
| KR | 20080064116 A | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 A | 3/2015 |
| TW | 200703396 A | 1/2007 |
| TW | M334397 U | 6/2008 |
| TW | 201108284 A | 3/2011 |
| TW | 201108286 A | 3/2011 |
| TW | M407429 U | 7/2011 |
| TW | 201246251 A | 11/2012 |
| TW | 201403646 A | 1/2014 |
| WO | 9744946 A1 | 11/1997 |
| WO | 2005057320 A2 | 6/2005 |
| WO | 2006022313 A1 | 3/2006 |
| WO | 2007049253 A2 | 5/2007 |
| WO | 2008045833 A1 | 4/2008 |
| WO | 2009005026 A1 | 1/2009 |
| WO | 2012011282 A1 | 1/2012 |
| WO | 2012027978 A1 | 3/2012 |
| WO | 2013096478 A2 | 6/2013 |
| WO | 2014175446 A1 | 10/2014 |

OTHER PUBLICATIONS

Elekson, "Reliable and Tested Wearable Electronics Embedment Solutions", http://www.wearable.technology/our-technologies, at least as early as Jan. 6, 2016, 3 pages.

* cited by examiner

KEYCAPS HAVING REDUCED THICKNESS

CROSS-REFERENCE TO RELATED APPLICATIONS

This application is a continuation of U.S. patent application Ser. No. 15/640,249, filed Jun. 30, 2017, and titled "Keycaps Having Reduced Thickness," which is a continuation of U.S. patent application Ser. No. 14/502,788, filed Sep. 30, 2014, now U.S. Pat. No. 9,704,670, issued Jul. 11, 2017 and titled "Keycaps Having Reduced Thickness," which is a non-provisional of and claims the benefit to U.S. Provisional Patent Application No. 61/884,259, filed Sep. 30, 2013 and titled "Keycaps Having Reduced Thickness," the disclosures of which are hereby incorporated by reference herein in their entireties.

TECHNICAL FIELD

This disclosure relates generally to input apparatuses for computing devices or other similar information processing devices and, in particular, to thin profile keyboards.

BACKGROUND

A pleasing exterior appearance of an electronic device is often difficult to pair with the market demand for advanced functionality, improved durability, and reduced thickness and weight. Some aesthetically pleasing materials may not be sufficiently durable to include in a device housing and other aesthetically pleasing materials may interfere with the advance functionality of the electronic device. Further, for certain input components such as buttons and keys, a user may physically engage the selected material several hundred thousand times, if not millions of times, over the life of a device.

Many visually pleasing solutions lack the durability for such extended function. This can be especially true when electronic devices and/or associated input devices are made smaller, thinner or otherwise reduced in dimension. Reduced dimensions of keycaps, for example, may lead to those keycaps being less structurally sound and so breaking or otherwise failing earlier during a use cycle than would thicker keycaps made of the same material.

Accordingly, there may be a present need for a durable and aesthetically pleasing external surface for an input device.

SUMMARY

This application provides techniques for forming and manufacturing an illuminated glass keycap for use with a key or keyboard as an input apparatus to an electronic computing device. In certain embodiments, an input apparatus may include a plurality of keys, each key of the plurality of keys including a transparent glass keycap having a top surface, a background layer comprising a glyph window, a glyph diffuser layer, a compressible scissor mechanism configured to activate electrical switch circuitry, and a light source having an on state and an off state. The light source may be oriented to transmit light through the transparent glass keycap. In certain embodiments, the transparent glass keycap is comprised of glass. In certain cases the glass may be a material such as sapphire, a ceramic or another scratch resistant material. Accordingly, the term "glass" may encompass such materials. The perimeter of the glass keycap may be beveled or otherwise polished.

Certain embodiments may relate to or take the form of an illuminated input apparatus having a glyph diffuser layer that may diffuse light through a glyph window. In these embodiments, the background layer may be opaque and the glyph window may be transparent. In other embodiments, the background layer may be translucent and the glyph window may be transparent. In further embodiments, the light source may be a light emitting diode, a light emitting polymer, or a light pipe or other visible light waveguide oriented to direct light through the transparent glass keycap.

Other embodiments described herein may relate to or take the form of an illuminated input apparatus having a light source including at least an on state and an off state. In certain cases, the on state may include a keycap perimeter illumination mode in which the light source may emit visible light proximate or otherwise adjacent to the perimeter of the keycap. In further embodiments, the on state may include a background illumination mode in which the light source may transmit light through the background layer. In this case, the background layer may diffuse the transmitted light before it exits the top surface of the transparent glass keycap. In further embodiments, the on state may include a glyph illumination mode in which the light source may transmit light through a glyph diffuser layer and further through the glyph window.

In other embodiments, the glyph diffuser layer is disposed partially within the glyph window, such that at least a portion of the glyph diffuser layer is coplanar with the background layer. In such an embodiment, or in similar embodiments, the glyph window may be etched from the background layer.

Other embodiments described herein may relate to or take the form of a method for manufacturing a light transmissive keycap for illuminating a keyboard, including the acts of selecting a transparent glass keycap, depositing a background ink layer on a bottom surface of the transparent glass keycap, etching a symbol aperture into the background ink layer, depositing a translucent glyph diffuser layer on the background ink over at least the symbol aperture, and aligning the transparent glass keycap along a vertical axis with a compressible scissor mechanism positioned above electrical switch circuitry. The method may also include beveling the perimeter edges of the transparent glass keycap.

Further embodiments may include positioning a light emitting element below the transparent glass keycap such that light emitted from the light emitting element transmits through the translucent glyph diffuser layer and through the symbol aperture. In certain cases the symbol aperture may be etched in a laser etching process or, in other embodiments, the symbol aperture may be formed by etching in a chemical process.

Other embodiments described herein may relate to or take the form of a keyboard with a plurality of keys, each of the plurality of keys having a keycap. Each keycap may include a glass top layer having at least four beveled edges along the perimeter of a top surface of the keycap, an ink layer disposed along a bottom surface of the glass top layer, a glyph window within the ink layer, and a diffuser fill within the glyph window. The keyboard may also include a light emissive layer, such as a layer of light emitting diodes, positioned below the keys. The keyboard can also include an electrical switch layer that has a number of electrical switches, each associated with an individual key.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same reference numerals in different drawings indicates similar, corresponding, or identical items.

DETAILED DESCRIPTION

Figure 1:
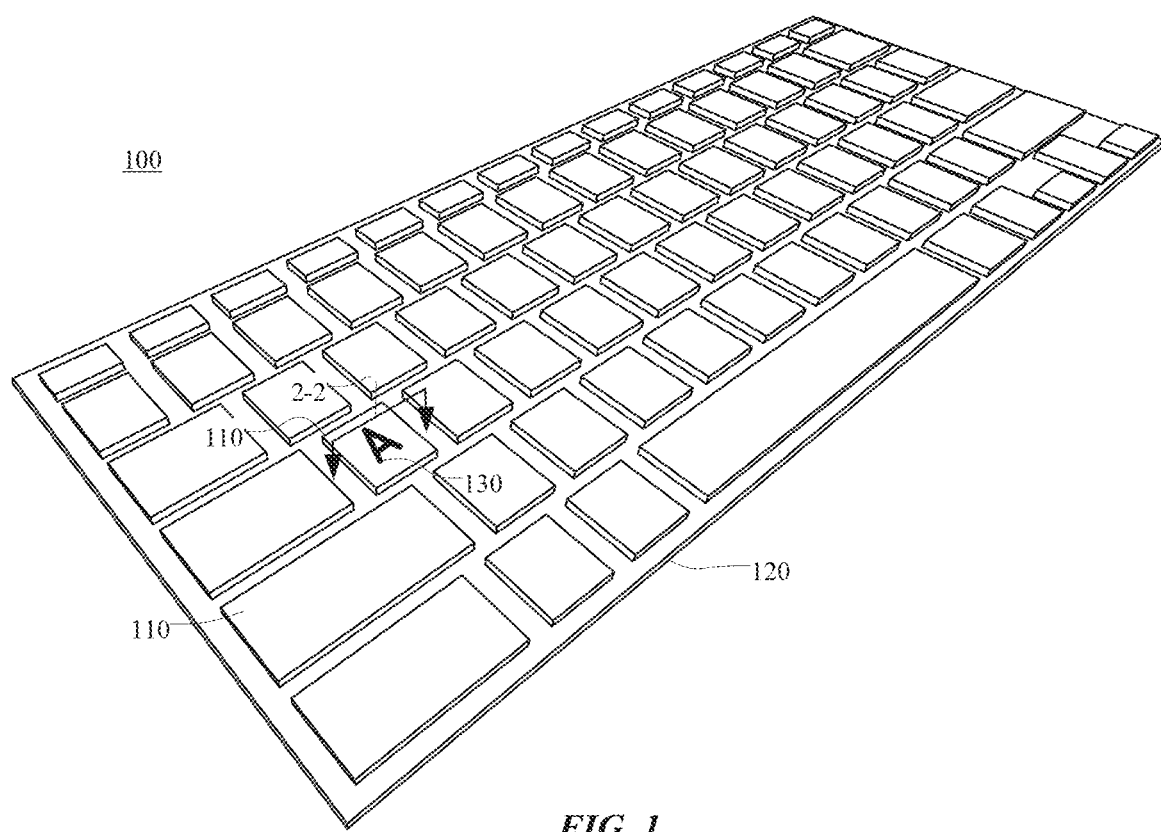
FIG. 1 is a perspective view of a sample embodiment of a sample keyboard for use with an electronic device.

Embodiments described herein may relate to or take the form of light-transmissive and power efficient input apparatuses with low-profile, durable external surfaces. In particular, certain embodiments may take the form of a fully or partially illuminated keyboard or keypad or individual key having glass keycaps. Such input apparatuses may be used in conjunction with personal computing devices such as laptop computers, tablet computers, or desktop computers as either integrated or peripheral devices. Certain other embodiments may take the form of a fully or partially illuminated button with a glass outer surface for use with other electronic devices, such as televisions, portable media players, cellular telephones, tablet computers, and the like.

One embodiment may be a back-illuminated key associated with a keyboard. The embodiment may include a glass keycap. The glass keycap can have beveled or otherwise polished edges along a top surface. Disposed immediately below the glass keycap may be a background layer formed of ink or another pigment, and may translucent, semi-transparent or opaque. In certain embodiments, the background layer may be applied to the glass keycap in a printing process, a screening process, an immersion process or any other suitable process.

Etched into the background layer may be a glyph, symbol, window, or aperture (collectively, a "glyph window"). The glyph window may take the form of any numeral, symbol or letter of any language, or any information-conveying symbol, appropriately suited to the input device as used. For example, the glyph window may take the form of an English letter or letters or symbols in one embodiment. In another embodiment, the glyph window may take the form of a simplified Chinese character or characters. The glyph window may be etched through the background layer by a laser scribing process, for example. In other embodiments, the glyph window may be etched via a mask and immerse chemical etching process. In still further embodiments, the glyph window may not be etched at all, but may instead be provided by selectively applying a background layer. For example, the background layer may be printed on a surface, such as a top or bottom surface, of the glass keycap in all areas except those reserved for the glyph window. In further embodiments, the glyph window may be formed within the background layer before the background layer is applied to the glass keycap.

A glyph diffuser layer may be disposed below the background layer. The glyph diffuser layer may be formed of a semi-transparent or translucent material that is doped with glass beads or another diffusion dopant. In certain embodiments, the glyph diffuser layer may also include a pigment or ink of a particular color. For example, in certain embodiments titanium oxide may be used to give the glyph diffuser layer a white color when light is transmitted through it. In certain further embodiments, the glyph diffuser layer may be disposed over the background layer with, and/or within the glyph window in a screening, printing, immersion, or any other suitable process. During the application of the glyph diffuser layer to the background layer, unwanted pockets of air may form within the glyph window, trapped by the application of the glyph diffuser layer. In order to remove the unwanted pockets of air, the keycap (with background layer and glyph diffuser layer formed) may be placed in a vacuum chamber such that differential pressure between the pockets and the vacuum cause the glyph diffuser layer to remove the air pockets. In another embodiment, the keycap with background layer and glyph diffuser layer may be placed within an autoclave or other high pressure chamber to facilitate a pressure differential to remove the air pockets.

The glyph diffuser layer may be smoothed or polished to a plane in a subsequent process such that a bottom surface of the glyph diffuser layer is substantially parallel with the top surface of the glass keycap. Once smoothed, the keycap may be attached to a scissor mechanism and other elements of a key, in order to assemble the key. In certain embodiments, the glyph diffuser layer may be polished such that the bottom surface of the layer is coplanar with the bottom of the background layer. In other embodiments, the glyph diffuser layer may be polished such that the bottom surface of the layer is parallel to, but separated by, a specified depth from the bottom surface of the background layer.

Included within, below, or adjacent to the scissor mechanism may be one or more light sources positioned to emit light through the keycap. In certain embodiments, the light source may include or be coupled to a light source such as an organic light-emitting diode (OLED), a light-emitting diode (LED), or any other suitable light source. In a first embodiment, the light source may be positioned to transmit light through the glyph diffuser layer and through the glyph window. In such an embodiment, the background layer may not transmit any of the light emitted by the light source. In this way, when viewing the keycap from above, a glyph may be illuminated.

In a further embodiment, the light source may be positioned to transmit light around the perimeter of the keycap. In this way, when viewing the keycap from above the perimeter of the key (or an area around the key perimeter) may be illuminated. In other words, the keycap may appear to have a halo surrounding its periphery.

In a further embodiment, the light source may be positioned to transmit light through the background layer. In such an embodiment, light may not necessarily pass through the glyph window. In this way, when viewing the keycap from above the background of a glyph may appear illuminated while the glyph itself remains dark.

FIG. 1 is a perspective view of a sample embodiment of an illuminated keyboard 100 for use with an electronic device (not shown). The illuminated keyboard 100 may be a peripheral component of a computing system, or in other embodiments, it may be an integral portion of a computing system. In further embodiments, the illuminated keyboard 100 may have a greater number of keys or a fewer number of keys. The keys may be arranged in various orders or configurations. The illuminated keyboard 100 may have one or more keys 110 and a housing 120 that fully or partially encases the internal components of the keyboard. Each of the one or more keys 110 may have a glyph window 130 associated with it (e.g., visible on the keycap). As illustrated, the one or more keys 110 may be of different sizes and/or positioned at different locations along the top surface of the illuminated keyboard 100.

Figure 2:
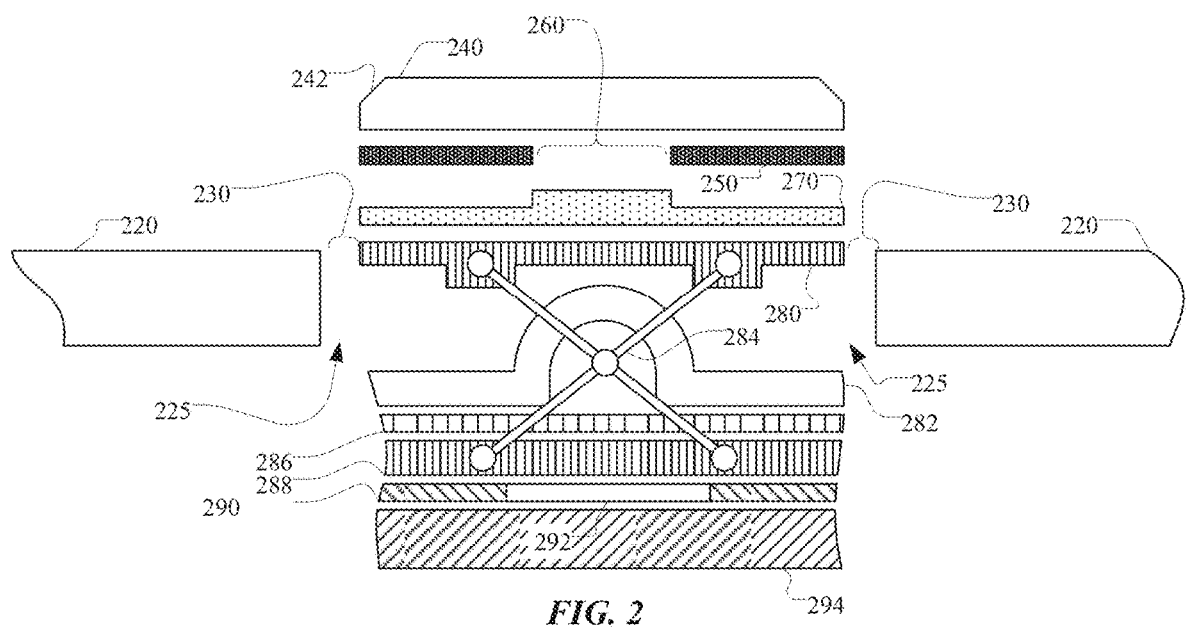
FIG. 2 is a partially exploded side cross-sectional view of a keycap and supporting structure of the sample keyboard of FIG. 1, taken along line 2-2 of FIG. 1.

FIG. 2 is a close-up and exploded side cross-sectional view of a key 200 of an embodiment of the illuminated keyboard 100 of FIG. 1 taken along line 2-2. The key 200 may be positioned at least partially within the housing 220 of the illuminated keyboard 100. A key aperture 225 may be defined through the housing 220. The key aperture 225 may be sized so that a perimeter gap 230 exists between the key 200 and the housing 220. The perimeter gap 230 may be selectively sized based on the size of the key 200. In certain embodiments, the key aperture 225 may not be present. Instead, one or more keys 110 (not shown in FIG. 2) may be arranged substantially adjacent to one another such that the perimeter gap 230 of each key is defined by its neighboring keys.

The term "horizontal" as used herein and except as otherwise noted, is defined as the plane parallel to the upper surface of the housing 220 of the illuminated keyboard 100. The term "vertical" as used herein and except as otherwise noted, is defined as the direction perpendicular to the horizontal plane. Similar directional terminology as used herein (e.g., "above" or "below" or "top" or "bottom") is defined with respect to the orientation of the keyboard shown in FIG. 1.

The key 200 may have a keycap 240. In certain embodiments, the keycap 240 may be composed of silica glass (which may be chemically treated), sapphire, or another similar substantially transparent and scratch resistant material. The keycap 240 may have a substantially flat top surface. In certain embodiments, the keycap 240 may have a slightly concave shape so as to enhance the feel of the key when depressed by a user. The top surface of the keycap 240 may have one or more beveled edges 242. A beveled edge 242 may be angled at a 45 degree angle as shown, or in some embodiments, the beveled edge 242 may be machined such that it takes another shape that reduces or increases the angle formed by the top and sidewalls of the keycap 240 along its perimeter.

A substantially opaque background layer 250 may be formed on an underside of the keycap 240. The background layer 250 may define a glyph window 260 extending through the background layer. Although shown in cross section, one may appreciate that the glyph window 260 may, when viewed from above, take the form of any numeral, symbol or letter of any language or symbol set appropriately suited to the illuminated keyboard 100 (not shown in FIG. 2). Essentially, the portions of the underside of the keycap 240 that are not coated, treated, or otherwise covered with the background layer may form the glyph window 260. As the glyph window may correspond to a letter, symbol, character, number and the like, it may vary in size, shape and cross-section from keycap to keycap. Further, some keycaps may lack any glyph window at all; the space bar is one example of this.

A glyph diffuser layer 270 may be formed on the underside of the background layer 250 and may fill (either partially or fully) the glyph window 260. The glyph diffuser layer 270 may be composed of a semi-transparent or translucent material that is doped with a diffusion dopant. In certain embodiments, the glyph diffuser layer 270 may also be doped with a colored pigment to color the layer. As one example, titanium oxide may be used to give the glyph diffuser layer a white appearance. The glyph diffuser layer 270 may also include complementary geometry to the glyph window 260. In this way, the glyph diffuser layer 270 may occupy the volume of the glyph window 260 within the background layer 250.

A mechanical support may be positioned beneath and attached to the keycap. For example, a scissor mechanism 284 or butterfly mechanism may be affixed to a keycap receiving pad 280. The receiving pad 280 may be adhered or otherwise bonded to the glyph diffuser layer 270. The keycap receiving pad 280 may include a structure such as a detent, ledge or aperture to accept one or more top crossbars forming part of a scissor mechanism 284.

In more detail, the keycap receiving pad 280 may have a substantially flat top surface and may be adhered or attached to the bottom surface of the glyph diffuser layer 270.

A membrane 282 of a dome switch may be positioned below the keycap receiving pad 280. In some embodiments, the membrane 282 may contact the bottom surface of the keycap receiving pad 280 when the key is in a neutral (e.g., unpressed) state, while in other embodiments the membrane 282 and keycap receiving pad 280 may be separated by an air gap when the key is in a neutral state. The membrane 282 may be constructed of a deformable material such as rubber, silicone, or any suitable polymer and may include one or more electrical contacts (not shown in the cross-section of FIG. 2). In some embodiments the membrane 282 may be substantially transparent, while in others the membrane may be translucent or opaque. In some embodiments, light may be transmitted to or through the keycap from a light source located to a side of the key, such as an LED or a light pipe connected to an LED.

Adjacent to the membrane 282 may be a compressible scissor mechanism 284. Below the membrane 282 may be a first contact wiring layer 286. Electrical contacts (not shown in the cross-section view of FIG. 2) may be disposed on the top surface of the first contact wiring layer 286 such that when the membrane 282 and the compressible scissor mechanism 284 compress beyond a selected threshold, the electrical contacts of the membrane 282 and the electrical contacts of the first contact wiring layer 286 complete an electrical circuit and thereby signal that the key 200 has been depressed.

The first contact wiring layer 286 may be disposed upon a first substrate layer 288 to provide structural support to the key 200. The substrate layer 288 may be composed of a transparent or substantially transparent material. Below the substrate layer 288 may be an illumination layer 290 including a light emitting element 292 which is centered below the keycap 240. The light emitting element 292 may be an LED, OLED, or any other suitable light source. Although shown as a single light source, one may appreciate that multiple light sources may be used. For example, a light emitting element 292 may be positioned on the illumination layer 290 so as to direct or transmit light through the perimeter gap 230. In this manner, the light emitting element 292 may illuminate the perimeter of the key 200, creating a halo effect about the key 200 when viewed from above.

In another embodiment, a light emitting element 292 may be positioned to direct light only through the glyph window 260. In this manner, the light emitting element 292 may illuminate the glyph window 260, creating an illuminated glyph effect on the surface of the key 200 when viewed from above.

In another embodiment, a light emitting element may be positioned to direct light only through the background layer 250. In this manner, the light emitting element 292 may illuminate the background area around the glyph window, leaving the glyph window area unilluminated. In such an embodiment, one may appreciate that the background layer 250 may be composed of a semi-transparent or translucent material. For example, in this embodiment the background layer 250 may be composed of a semi-transparent or translucent material that is doped with glass beads or other diffusion dopant.

One may further appreciate that a plurality of light emitting elements 292 may be disposed upon or within the light emissive layer 290. In this manner, multiple portions of the key 200 may be selectively or jointly illuminated. Below the light emissive layer 290 may be disposed a second substrate layer 294, providing structural support to the key 200.

One may appreciate that FIG. 2 is not necessarily drawn to scale. For clarity, the relative height of each illustrated item has in some cases been exaggerated to show the relationship between each of the several layers forming key 200. For example, the background layer 250 and the glyph diffuser layer 270 may only be a few microns in height. Further, one may appreciate the keycap 240 may be less than a millimeter in height.

Figure 3A:
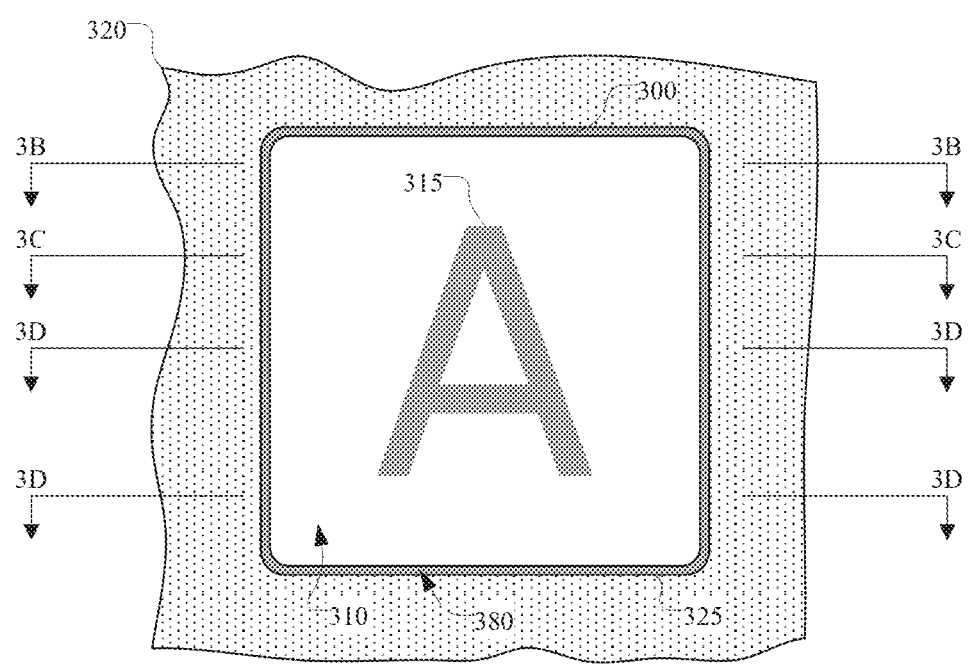
FIG. 3A is a top plan view of a keycap showing a symbol as a portion of the embodiment as shown in FIG. 1.

FIG. 3A is a top plan view of a keycap 300 showing a glyph as a portion of the embodiment as shown in FIG. 1. The keycap may include at least background area 310 and a glyph area 315, which as illustrated shows the English letter "A." The keycap 300 may be situated within the housing 320 of an illuminated keyboard 100 (now shown, see FIG. 1). The keycap 300 may be positioned within a key aperture 325. The horizontal surface area of the key aperture 325 may be slightly larger than the horizontal surface area of the keycap 300 such that a keycap perimeter gap 380 is exposed.

FIGS. 3B-3E are close up side views of the embodiment shown in FIG. 3A taken along cross sections 3B-3E respectively. Visible in all four cross sections shown in FIGS. 3B-3E is the keycap 340. The keycap 340 sits within a key aperture (not labeled) formed in the keyboard housing 320. A perimeter gap 330 is formed between the edges of the key aperture and the keycap. As noted with respect to the embodiment illustrated by FIG. 2, the keycap 340 may be composed of glass and may have beveled or polished edges.

Visible in all four cross sections shown in FIGS. 3B-3E is the background layer 350. Also as noted with respect to the embodiment shown in FIG. 2, the background layer 350 may be disposed directly below the glass keycap 340. Disposed below the background layer 350 is the glyph diffusion layer 370.

One may appreciate that line 3B-3B of FIG. 3A may not intersect any portion of the glyph area 315 of FIG. 3A. Accordingly, in the cross-section shown in FIG. 3B, no portion of a glyph window is present or illustrated. However, line 3C-3C of FIG. 3A does intersect a portion of the glyph area 315 of FIG. 3A. Specifically, line 3C-3C intersects the crest of the "A" glyph as illustrated in FIG. 3A. Accordingly, within the cross section shown in FIG. 3C, a portion of a glyph window 360 is shown. Because line 3C-3C intersects the glyph window only once, FIG. 3C illustrates only a single portion of the glyph window 360.

Figure 3B:
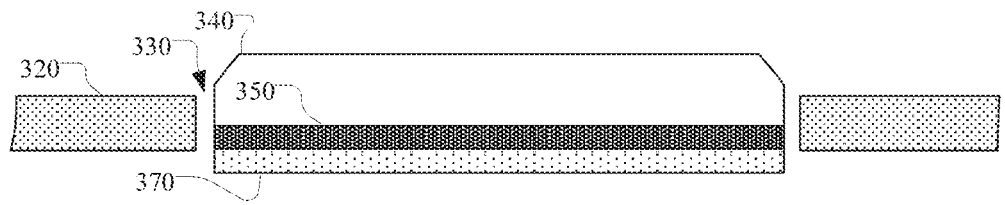
FIG. 3B is a side view of the embodiment shown in FIG. 3A taken along line 3B-3B.
Figure 3C:
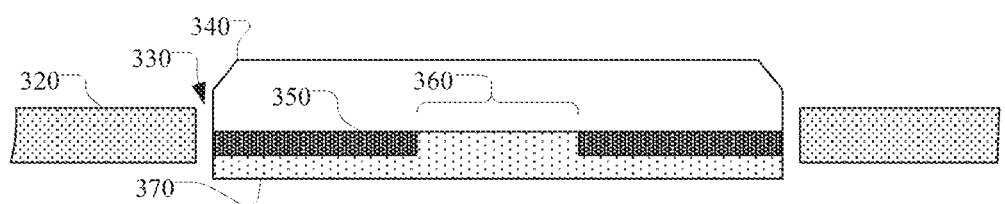
FIG. 3C is a side view of the embodiment shown in FIG. 3A taken along line 3C-3C.
Figure 3D:
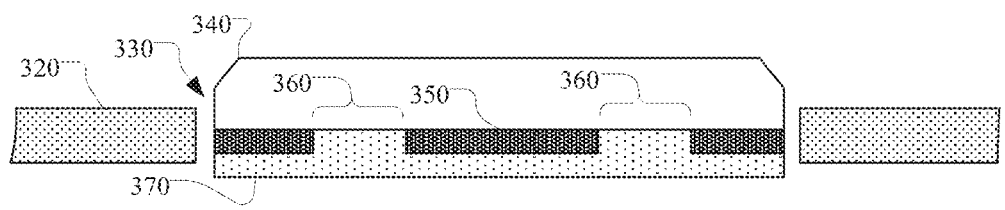
FIG. 3D is a side view of the embodiment shown in FIG. 3A taken along line 3D-3D.

FIG. 3D is a close up side view of the embodiment shown in FIG. 3A taken along line 3D-3D, which intersects both legs of the letter "A," illustrated as the glyph area 315 in FIG. 3A. Accordingly, in cross section FIG. 3D illustrates two portions of the glyph window 360 separated by a portion of the background layer 350.

Figure 3E:
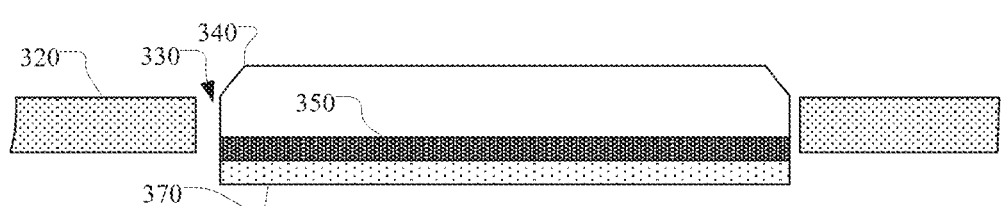
FIG. 3E is a side view of the embodiment shown in FIG. 3A taken along line 3E-3E.

Similar to FIG. 3B, FIG. 3E does not intersect any portion of the glyph area 315 of FIG. 3A and accordingly, no portion of a glyph window is present or illustrated.

With respect to FIGS. 4A-4D, the term "horizontal" is defined as the plane parallel to the surface of the glass keycap. The term "vertical" as with respect to FIGS. 4A-4D is defined as the direction perpendicular to the horizontal plane. Similar directional terminology as used herein (e.g., "above" or "below" or "on" or "under") is defined with respect to the horizontal plane.

Figure 4A:
FIG. 4A is an inverted side view of an embodiment showing a sample cross section of a keycap after a background layer is applied.

FIG. 4A is an inverted close up side view of an embodiment showing a sample cross section of a keycap 440 after a background layer 450 is applied. The background layer 450 may be composed of ink or pigment, and may be translucent, semi-transparent or opaque. In certain embodiments, the background layer 450 may be applied to the glass keycap 440 in a printing process, a screening process, an immersion process or any other suitable process.

Figure 4B:
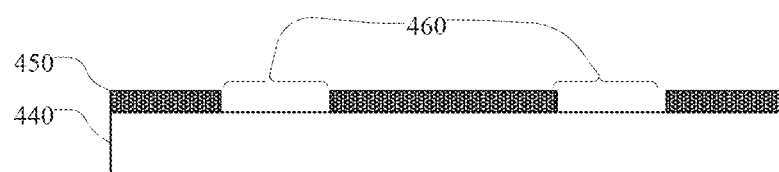
FIG. 4B is an inverted side view of the embodiment shown in FIG. 4A showing a sample cross section of a keycap after a background layer has been etched to expose portions of a glyph window.

FIG. 4B is an inverted close up side view of the embodiment shown in FIG. 4A showing a sample cross section of a keycap 440 after a background layer 450 has been etched to expose portions of a glyph window 460. The glyph window 460 may be etched through the background layer in a laser-scribing process. For example, a laser may ablate the background layer 450 in order to expose the glyph window 460. In certain cases, the laser may be sufficiently powerful to ablate or otherwise remove the material of the background layer 450 while being insufficiently powerful to ablate or otherwise etch or damage the material selected for the keycap 440.

In other embodiments, the glyph window 460 may be etched with a chemical etching process. For example, a mask may be applied over the background layer 450. The mask may cover portions of the background layer 450 that will remain after etching, but may expose all portions of the background layer 450 that should be removed in order to expose the glyph window 460. After the mask is applied, the keycap 440 and background layer 450 may be immersed in or exposed to an etching solution that dissolves or otherwise reacts with the material selected for the background layer 450 but not the material selected for the mask or the material selected for the keycap 440. After a proscribed period of time, the keycap 440 may be removed from the etching solution and the mask may be removed from the background layer 450.

In still further embodiments, the glyph window 460 may not be etched at all, but may instead be formed by selectively applying background layer 450. For example, the background layer 450 may be printed along the surface of the glass keycap 440 in all areas except those reserved for the glyph window 460.

Figure 4C:
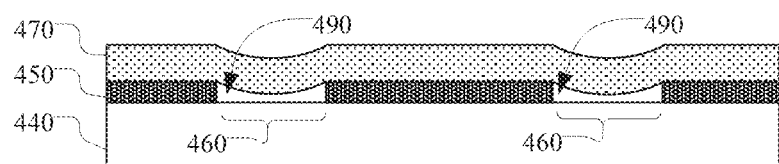
FIG. 4C is an inverted side view of the embodiment shown in FIG. 4B showing a sample cross section of a keycap after a glyph diffuser layer is applied over the background layer and the exposed portions of a glyph window.

FIG. 4C is an inverted close-up side view of the embodiment shown in FIG. 4B, showing a sample cross section of a keycap 440 after a glyph diffuser layer 470 is applied over the background layer 450 and the exposed portions of a glyph window 460. In certain embodiments, during the application of the glyph diffuser layer 470 to the background layer 450, unwanted pockets of air 490 may remain within the glyph window 460. The unwanted pockets of air 490 may cause undesirable visual artifacts in the keycap 440.

In order to remove the unwanted pockets of air 490, the keycap 440 (with background layer 450 and glyph diffuser layer 470 already formed) may be placed in a vacuum chamber (not shown) such that a negative pressure differential forms to eliminate the air pockets 490. Generally, air pockets 490 may be created at or near atmospheric pressure. Accordingly, when placed in a vacuum environment, the pressure of the air pockets 490 may equalize with the vacuum, which may pull the diffuser layer 470 in to fill the entire volume of the glyph window 460, as shown in FIG. 4D.

In another embodiment, the keycap 440, with background layer 450 and glyph diffuser layer 470, may be placed within an autoclave or other high pressure chamber to facilitate a positive pressure differential to remove the air pockets 490. As noted above, the air pockets 490 may be created at or near atmospheric pressure. When placed in a high pressure environment, the difference in pressure may push the diffuser layer 470 to fill the entire volume of the glyph window 460, as shown in FIG. 4D.

Figure 4D:
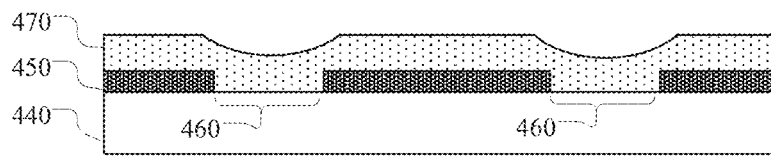
FIG. 4D is an inverted side view of the embodiment shown in FIG. 4C showing a sample cross section of a keycap after a glyph diffuser layer is drawn in to occupy the area of the glyph window.
Figure 4E:
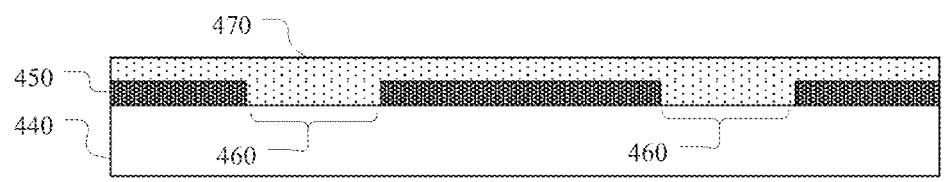
FIG. 4E is an inverted side view of the embodiment shown in FIG. 4D showing a sample cross section of a keycap with the glyph diffuser layer finished to a smooth plane, parallel with the planes of the keycap and the background layer.

FIG. 4E is an inverted close up side view of the embodiment shown in FIG. 4D showing a sample cross section of a keycap 440 with the glyph diffuser layer 470 finished to a smooth plane, parallel with the planes of the keycap 440 and the background layer 450. Once polished or otherwise smoothed, the glyph diffuser layer 470 may be attached to a scissor mechanism (not shown) or other button mechanism positioned to activate electrical switch circuitry when depressed. The glyph diffuser layer 470 may be smoothed in order to provide a substantially parallel relationship between the scissor mechanism and the top surface of the keycap 440.

Figure 4F:
FIG. 4F is an inverted side view of the embodiment shown in FIG. 4D showing a sample cross section of a keycap with the glyph diffuser layer finished to a smooth plane, coplanar with a surface of a background layer.

FIG. 4F is an inverted close-up side view of the embodiment shown in FIG. 4D showing a sample cross section of a keycap 440 with the glyph diffuser layer 470 finished to a smooth plane that is coplanar with a surface of a background layer 450. In certain embodiments, smoothing the glyph diffuser layer in this manner may provide for an exceptionally thin overall key thickness.

One may appreciate that FIGS. 3A-4F are not drawn to scale. For clarity, the relative height of each illustrated item has in some cases been substantially exaggerated to show the relationship between each of the several layers forming the illustrated key. For example, one may appreciate that the background layer 350 and 450 and the glyph diffuser layer 370 and 470 may only be a few microns in height. Further, one may appreciate the keycap 340 and 440 may be less than a millimeter in height.

FIGS. 5A-5F illustrate various configurations of selective a joint illumination of individual portions of a key according to one embodiment of the invention.

Figure 5A:
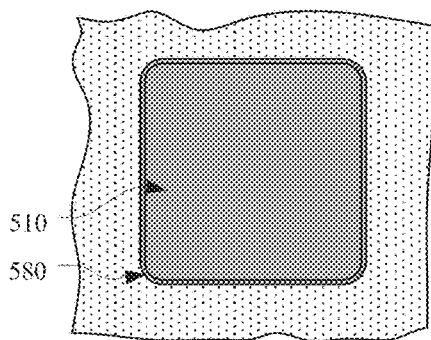
FIG. 5A is a top plan view of a keycap showing illumination of a perimeter portion, a glyph portion, and a background portion in an off state.

FIG. 5A is a top plan view of a keycap showing the selective illumination of a perimeter gap portion 580, a glyph area portion 515 (not shown), and a background area portion 510 in an off state. One may note that in the illustrated embodiment, a glyph portion 515 is not visible. In certain embodiments, the boundaries between the background portion 510 and the glyph area portion 515 are not distinguishable. Accordingly, FIG. 5A is illustrated without the glyph area visible.

Figure 5B:
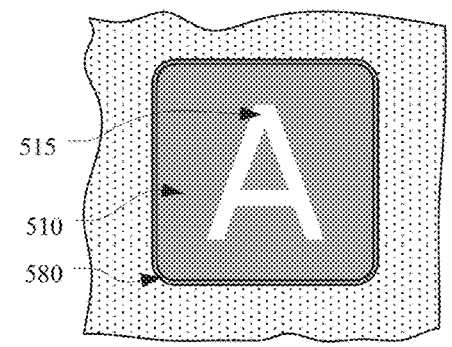
FIG. 5B is a top plan view of a keycap showing illumination of a perimeter portion and a background portion in an off state with the illumination of a glyph portion in an on state.

FIG. 5B is a top plan view of a keycap showing illumination of a perimeter gap portion 580 and a background area portion 510 in an off state with the illumination of a glyph area portion 515 in an on state.

Figure 5C:
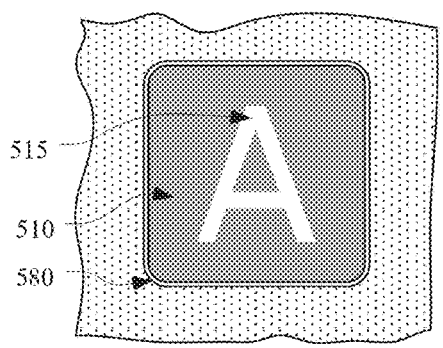
FIG. 5C is a top plan view of a keycap showing illumination of a background portion in an off state with the illumination of a perimeter portion and a glyph portion in an on state.

FIG. 5C is a top plan view of a keycap showing illumination of a background area portion 510 in an off state with the illumination of a perimeter gap portion 580 and a glyph area portion 515 in an on state. In this manner, FIG. 5C illustrates a glyph illumination mode of the keycap.

Figure 5D:
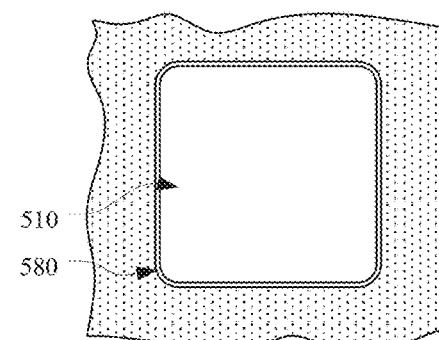
FIG. 5D is a top plan view of a keycap showing illumination of a perimeter portion, a glyph portion, and a background portion in an on state.

FIG. 5D is a top plan view of a keycap showing illumination of a perimeter gap portion 580, a glyph area portion 515 (not shown), and a background area portion 510 in an on state. As noted above with respect to FIG. 5A, the glyph portion 515 is not visible. In certain embodiments, the boundaries between the background portion 510 and the glyph area portion 515 are not distinguishable. Accordingly, FIG. 5D is also illustrated without the glyph area visible. In this manner, FIG. 5D illustrates a perimeter illumination mode of the keycap.

Figure 5E:
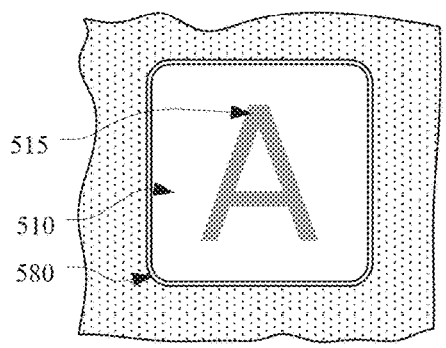
FIG. 5E is a top plan view of a keycap showing illumination of a glyph portion in an off state with the illumination of a perimeter portion and a background portion in an on state.

FIG. 5E is a top plan view of a keycap showing illumination of a glyph area portion 515 in an off state with the illumination of a perimeter gap portion 580 and a background area portion 510 in an on state. In this embodiment, the glyph area 515 may visible to a user as a shadow and the background area portion 510 and the perimeter gap portion 580 may appear as a singular or substantially singular illuminated area.

Figure 5F:
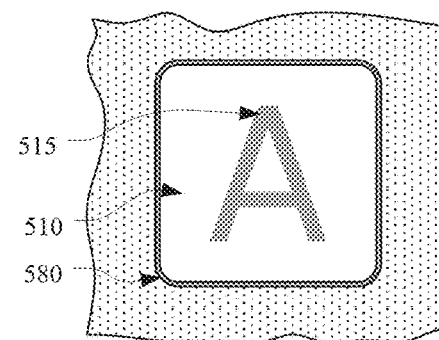
FIG. 5F is a top plan view of a keycap showing illumination of a glyph portion and a perimeter portion in an off state with the background portion in an on state.

FIG. 5F is a top plan view of a keycap showing illumination of a glyph area portion 515 and a perimeter gap portion 580 in an off state with the background area portion 510 in an on state. In this embodiment, the glyph area 515 may visible to a user as a shadow within the illuminated background area portion 510. The darkened perimeter gap portion 580 may provide enhanced contrast with the background area 510. In this manner, FIG. 5F illustrates a background illumination mode of the keycap.

Although FIGS. 5A-5F illustrate various combinations of illuminated portions of a keycap, one may appreciate that additional or fewer combinations are contemplated. One may appreciate further that individual keys on the same keyboard may be illuminated separately, sequentially, with differing brightness, for varying durations, etc.

Figure 6:
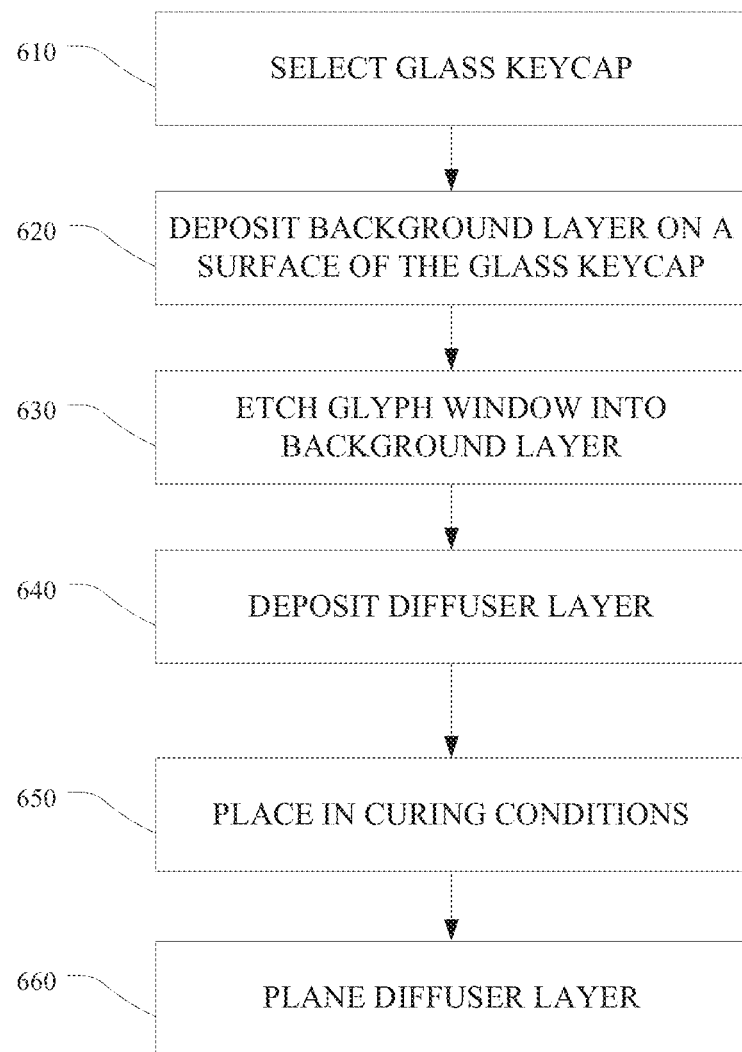
FIG. 6 is a flow chart illustrating operations of a sample method for manufacturing an illuminated input apparatus.

FIG. 6 is a flow chart illustrating operations of a sample method for manufacturing an illuminated input apparatus. At 610, a glass keycap may be selected. In certain embodiments, the glass keycap may be singulated from a larger sheet or, in other embodiments a large mother sheet containing a plurality of individual glass keycaps to be singulated in a later process.

At 620, a background layer may be deposited on the glass keycap. In certain embodiments, the background layer may be applied to the glass keycap in a printing process, a screening process, an immersion process or any other suitable process. In certain embodiments, the background layer may be cured before other operations continue.

At 630, a glyph window may be etched into the background layer. The glyph window may be etched in a laser etching process, or in other embodiments, the glyph window may be formed by etching in a chemical process. The glyph window may take the form of any numeral, symbol or letter of any language appropriately suited to the keycap. One may further appreciate that in certain embodiments, operations 620 and 630 may be accomplished simultaneously if the background layer is applied in a printing process.

At 640, a diffuser layer may be applied to the background layer. The diffuser layer may be composed of a semi-transparent or translucent material that is doped with glass beads or other diffusion dopant. The diffuser layer may be disposed over the background layer with glyph window in a screening, printing, immersion, or any other suitable process.

At 650, the glass keycap, background layer, and diffuser layer may be placed in curing conditions in order to solidify or otherwise bond the layers together. Curing conditions may include but are not limited to an ultraviolet oven, a heated oven, a vacuum chamber, or an autoclave chamber. The curing process may include processes to remove unwanted air pockets from either the background layer or the diffuser layer.

At 660, the diffuser layer may be polished or otherwise finished to a plane substantially parallel to the top surface of the glass keycap. The process may conclude at 670.

One may appreciate that although many embodiments are disclosed above, that the operations presented in FIG. 6 are meant as exemplary and accordingly are not exhaustive. One may further appreciate that alternate step order, or additional or fewer steps may be used to accomplish methods contemplated here.

Where components or modules of the invention are implemented in whole or in part using software, in one embodiment, these software elements can be implemented to operate with a computing or processing module capable of carrying out the functionality described with respect thereto.

Embodiments have been described herein with respect to glass keycaps, but it should be appreciated that structures, methods, processes, apparatuses and the like may employ, operate with, be incorporated into or otherwise associated with keycaps and/or keys made from other materials. For example, certain embodiments may use a metal keycap, a ceramic keycap, a polymer keycap, and so on.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied alone or in various combinations to one or more of the other embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. A keyboard for a laptop computer, the keyboard comprising:
   a key comprising:
      a keycap comprising an at least partially transparent material, the at least partially transparent material having a bottom surface;
      a background ink layer disposed on the bottom surface of the at least partially transparent material and defining a glyph window having a side surface, the background ink layer comprising a bottom surface and a top surface; and
      a glyph diffuser contacting the side surface of the glyph window between the top surface and the bottom surface of the background ink layer and having a bottom surface coplanar with the bottom surface of the background ink layer;
   a substrate positioned below the key;
   a switch positioned between the substrate and the key;
   a support mechanism configured to support the key while the key is depressed by a user relative to the substrate.

2. The keyboard of claim 1, wherein the background ink layer comprises a top surface and the glyph diffuser comprises a top surface, the top surface of the glyph diffuser being coplanar with the top surface of the background ink layer.

3. The keyboard of claim 1, wherein the glyph diffuser fills an entire volume of the glyph window.

4. The keyboard of claim 1, wherein the bottom surface of the glyph diffuser is parallel to a bottom surface of the keycap.

5. The keyboard of claim 1, wherein the bottom surface of the glyph diffuser is parallel to a top surface of the keycap.

6. The keyboard of claim 1, wherein the keycap comprises a concave top surface.

7. The keyboard of claim 1, wherein the background ink layer is opaque and the glyph diffuser is at least partially transparent.

8. The keyboard of claim 1, further comprising a receiving pad attached to the glyph diffuser and coupled with the support mechanism.

9. The keyboard of claim 8, wherein the receiving pad is configured to contact the switch when the key is depressed by the user.

10. The keyboard of claim 8, wherein the receiving pad is separated from the switch by an air gap.

11. A method of manufacturing a keycap, the method comprising:
- depositing a background ink layer on a bottom surface of the keycap, the keycap comprising an at least partially transparent material;
- creating a glyph aperture through the background ink layer, the glyph aperture having a lateral width, wherein the keycap is at least partially exposed through the background ink layer;
- depositing a glyph diffuser material into the glyph aperture between a top surface of the background ink layer and a bottom surface of the background ink layer and filling the lateral width of the glyph aperture;
- planing the glyph diffuser material such that a bottom surface of the glyph diffuser material is coplanar with the bottom surface of the background ink layer.

12. The method of claim 11, wherein the glyph diffuser material is deposited into the glyph aperture under vacuum conditions.

13. The method of claim 11, wherein negative pressure pulls the glyph diffuser material into the glyph aperture.

14. The method of claim 11, wherein the glyph diffuser material fills an entire volume of the glyph aperture.

15. The method of claim 11, wherein planing the glyph diffuser material comprises removing glyph diffuser material located below the bottom surface of the background ink layer.

16. The method of claim 11, further comprising forming a top surface of the glyph diffuser material to be coplanar with the bottom surface of the keycap.

17. The method of claim 11, further comprising attaching a receiving pad to the glyph diffuser material or to the background ink layer.

18. A keycap for a keyboard of an electronic device, the keycap comprising:
- a transparent body having a top surface and a bottom surface, the top surface being at least partially concave;
- a background layer formed on the bottom surface of the transparent body, the background layer defining a glyph shape;
- a diffuser layer configured to distribute light through the background layer or the glyph shape, the diffuser layer being positioned on an underside of the background layer and abutting sides of the glyph shape of the background layer, the diffuser layer being configured to link the background layer to a key support mechanism.

19. The keycap of claim 18, wherein the transparent body comprises a glass or sapphire material.

20. The keycap of claim 18, wherein the transparent body includes a beveled edge.

* * * * *